(12) United States Patent
Nose

(10) Patent No.: US 6,211,595 B1
(45) Date of Patent: *Apr. 3, 2001

(54) ARMATURE STRUCTURE OF TOROIDAL WINDING TYPE ROTATING ELECTRIC MACHINE

(75) Inventor: Tamotsu Nose, Nagano (JP)

(73) Assignee: Sankyo Seiki Mfg. Co., Ltd., Nagano-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,957

(22) Filed: Sep. 1, 1998

(30) Foreign Application Priority Data

Jul. 18, 1997 (JP) .................................................. 9-210054
May 6, 1998 (JP) .................................................. 10-123613

(51) Int. Cl.⁷ .............................. H02K 1/00; H02K 1/06; H02K 1/18; H02K 1/12; H02K 1/22
(52) U.S. Cl. .......................... 310/216; 310/217; 310/218; 310/254; 310/258; 310/259; 310/261
(58) Field of Search ....................................... 310/164, 166, 310/208, 216, 217, 218, 254, 258, 259, 261, 267, 168, 171, 46, 201; 336/229; 318/727; 322/47

(56) References Cited

U.S. PATENT DOCUMENTS

| | | | |
|---|---|---|---|
| 713,604 | * 11/1902 | Churchward | 310/218 |
| 2,247,890 | * 7/1941 | Reardon | 310/216 |
| 3,588,888 | * 6/1971 | Harden | 340/378 R |
| 3,827,141 | * 8/1974 | Hallerback | 29/596 |
| 4,053,801 | * 10/1977 | Ray et al. | 310/216 |
| 4,939,399 | * 7/1990 | Oh et al. | 310/198 |
| 5,079,467 | * 1/1992 | Dorman | 310/156 |
| 5,703,421 | * 12/1997 | Durkin | 310/61 |
| 5,739,620 | * 4/1998 | Wu et al. | 310/254 |
| 5,798,583 | * 8/1998 | Morita | 310/42 |
| 5,856,714 | * 1/1999 | Sugiura | 310/49 R |
| 5,864,197 | * 1/1999 | Naito et al. | 310/261 |

OTHER PUBLICATIONS

A. L. Jokl, Theory and Design of Synchoronous Machines, Spring 1993, pp. 1–2.*

* cited by examiner

Primary Examiner—Elvin Enad
Assistant Examiner—Dang Dinh Le
(74) Attorney, Agent, or Firm—Reed Smith LLP (57) ABSTRACT

A structure of an armature of a toroidal winding type rotating electric machine, such as a motor or generator, which constitutes at least a member of a stator or a rotor is disclosed. The structure comprises a laminated core having an annular core portion and a facing core portion that extends from the annular core portion toward an opposing machine member. A coil is wound with a toroidal winding about the annular core portion of the laminated core. A partial laminating core is laminated on the facing core portion of the armature to enlarge the facing surface opposite the opposing machine member. The total lamination thickness of the facing core portion and partial laminating core portion is larger than the thickness of the annular core portion.

26 Claims, 8 Drawing Sheets

RELATED ART

ARMATURE STRUCTURE OF TOROIDAL WINDING TYPE ROTATING ELECTRIC MACHINE

BACKGROUND OF THE INVENTION a) Field of the Invention

The present invention relates to an armature structure of a toroidal winding type electric rotating machine, in which a plurality of coils are attached at a predetermined space to an annular core portion of a laminated core.

b) Description of the Related Art

Figure 19:
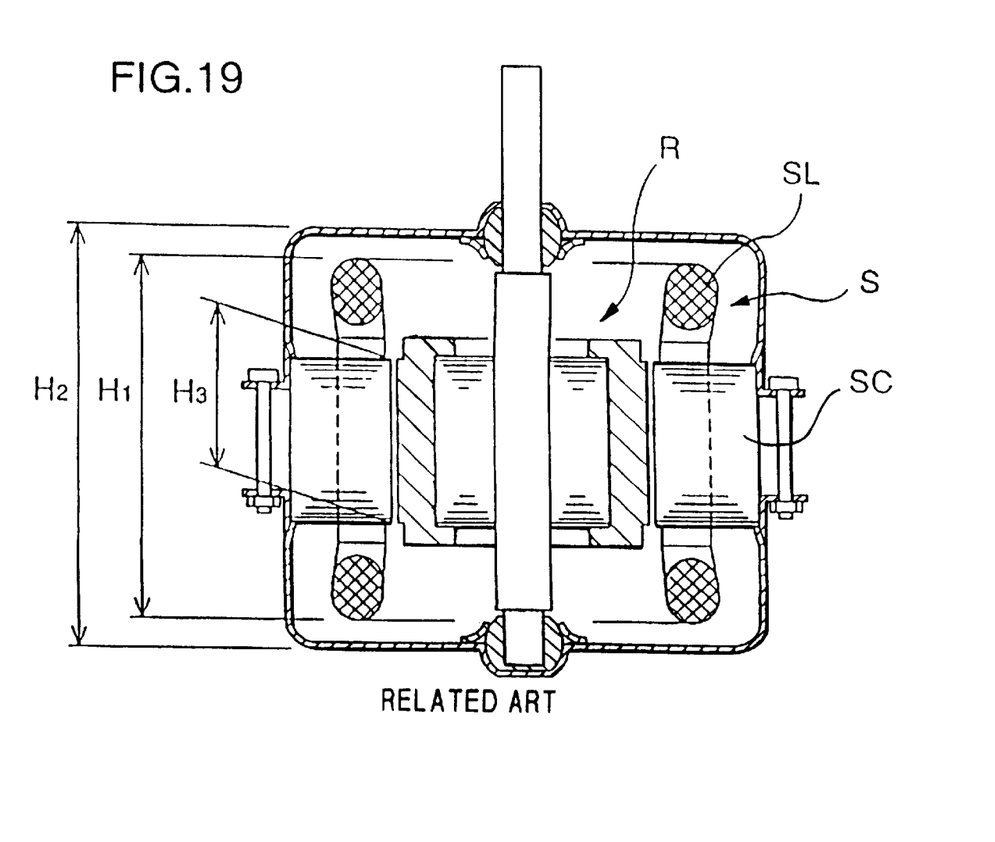
FIG. 19 is a vertical cross-sectional view of a structural example of a conventional rotating electric machine.

Generally, a rotating electric machine that needs sine waveform magnetic field in an air gap portion employs a distributed winding for a winding method. For example, in a three-phase inductance motor illustrated in FIG. 19, a stator S is arranged to surround an outer circumference of a rotor R, and a coil SL is wound about a laminated core SC of an armature constituting a stator S such that the coil SL is superposed, shifting slots. This method in which the coil SL is superposed shifting the slots, however, makes it difficult to wind the coil as well as requires longer winding. Thus, the winding height H1 may be higher.

On the other hand, a toroidal winding method is known in which a coil is wound about a core annular portion. The toroidal winding method has excellent features in that winding is easy and short because each wound coil is not superposed, and thus the winding height remains low.

In conventional toroidal winding type rotating electric machines, except a flat type, most of the properties of the toroidal winding may be inferior to those of the general distributed winding. Therefore, this method cannot be adopted in some technical fields.

In addition, global environmental issues have become serious recently, requiring energy-saving and power-saving as a first priority. Especially environmental issues are dominated by the issue of power consumption these days, and motors consumes more than half of the available power. For this reason, it is very important to increase motor efficiency and decrease loss (of power) as much as possible. Also, the same consideration is given to generators that generate electric power.

OBJECT AND SUMMARY OF THE INVENTION

A primary object of the present invention is to provide an armature structure of a rotating electric machine in which an armature structure of a toroidal winding type rotating electric machine, excellent in winding, is modified for higher efficiency (enhanced property) so that the efficiency value is greatly improved.

The present invention relates to a property-improved structure of the rotating electric machines including motors and generators. Motors convert electrical energy to mechanical energy; generators convert mechanical energy to electrical energy. Therefore, motors and generators are basically the same in structure and configuration. It is, therefore, possible to use a motor as a generator, and vice versa. For this reason, all the following description will be referred to a motor although the improvement applies equally well to a generator.

Generally, output and torque are used as index of the motor's property. However, the motor's property cannot be expressed in an absolute value by the above indices because the output and torque vary depending on applied voltage, the number of windings, radiating condition, design, etc. The efficiency value is another index of the motor's property which properly expresses the relationship between the output and the loss. However, efficiency value also varies depending on loads or the number of rotations, and therefore, with the initial zero output, the efficiency value is also zero. This also cannot be an absolute index to express the motor's property.

To improve the efficiency value of a motor, it is a basic to understand what the motor's property is, what the efficiency is, and how they are determined. As a result of studies done by the present inventor, the following was understood.

The absolute index of the motor's property is a proportional constant that expresses (determines) the relationship between the torque generated and the loss (copper loss) caused. In a motor without magnets, the proportional constant equals torque/copper loss; in a motor having magnets, the proportional constant is $(torque)^2$/copper loss. In other words, the proportional constant that expresses the relationship between the torque and the copper loss caused when the current is applied never changes even when the applied voltage, the number of windings (with the same space factor), and the load condition are changed. Thus, it is understood that this proportional constant is an absolute index that expresses the motor's property.

Also, the efficiency value is output/input=output/(output+loss), where the output is the number of rotation×torque, the number of rotations can be expressed by the applied voltage and the loss, and the loss mainly means the copper loss. Therefore, it is understood that the efficiency value is mostly determined by the proportional constant.

To enhance the motor's property (to increase the efficiency), various attempts have been made, such as making large motors, employing magnets having high energy product, and increasing the space factor of the winding. However, the motor's property is enhanced by changing the condition of factors that determine the proportional constant.

Next described are the reasons why this proportional constant value determines the absolute index of the motor's property and the factors that determine this proportional constant value.

The magnitude of the motor torque depends on the amount of the change in magnetic energy caused by relative move between the primary and secondary sides (currents) which are placed opposite one another. There are two kinds of magnetic energies: one generated and retained by a self-inductance L between the primary and secondary sides (currents); the other generated and retained by a mutual-inductance M between the primary and secondary sides (currents). Which magnetic energy is used for driving depends on the type and structure of the motor. Inductance motors, DC motors, and brushless motors use the magnetic energy caused by M while reluctance motors use the magnetic energy caused by L.

When the configuration such as the number of magnet poles is set, the magnitude of the torque generated at primary and secondary currents $I_1$ and $I_2$ is mostly determined by the maximum value of the magnetic energy, that is, the magnitude of the self-inductance L or the mutual-inductance M. The magnitude of the magnetic energy by the self-inductance L is expressed by $(½)×L×I^2$; the magnitude of the magnetic energy generated by the mutual-inductance M is expressed by $M×I_1×I_2$. Most of the normal motors other than reluctance motors employ the mutual-inductance M for driving. In many of the motors that do not use magnets, such as inductance motors and universal motors, the first current $I_1$ is proportional to the secondary current $I_2$. Therefore, the magnetic energy can be expressed by $M×I_1×I_2=M×I^2$ where I represents the total current. When a magnet is used for only one side (assuming, it is the primary side), because the magnet is an electromagnet of steady current, the current $I_1$ is constant and $M \times I_1 = \phi$ (effective magnetic flux). Therefore, the magnetic energy thereof can be expressed by $M \times I_1 \times I_2 = \phi \times I$.

Since the copper loss is a resistance loss, it can be expressed by $R \times I^2$. In a motor without magnets, the proportional constant that determines the relationship between the torque and the copper loss is torque/copper loss. Consequently, the proportional constant can be expressed by L/R or M/R. With a motor having magnets, the proportional constant is (torque)$^2$/copper loss, bringing $M^2/R$ as a result.

Considered next is the factors that determine L, M, and R. Eliminating the factor, the number of winding turns of coil, which affects equally L, M, and R, L and M can be mainly expressed by the primary-secondary-sides facing surface S and the air gap length, g. For the motor having magnets, material characteristics, size, and shape of the magnet are further included as the factors. R is mainly determined by a coil cross-sectional surface A and the coil length, I, per winding turn. Considering that the air gap length, g, and the magnet components are mostly fixed, the above mentioned proportional constant can be expressed by only main components as follows:

a) motor without magnets (inductance, universal): S×A/I=S/coil component;

b) motor having magnets: S$^2$×A/I=S$^2$/coil component;

c) reluctance motor: S×A/I=S/coil component.

It is understood that improving the main components constituting the proportional constant to increase the proportional constant value enhances the motor's property, resulting in improving the efficiency value.

Observing the proportional constant in conventional products, one finds that conventional rotating electric machines have a drawback. In other words, the common factor to determine the numerator of the formula for the proportional constant is the primary-secondary magnetic-facing surface S. The more the facing surface S is enlarged, the higher the proportional constant and efficiency value become.

It is understood, however, from the example of the three-phase inductance motor (see FIG. 19) which is a typical rotating electric machine, that the ratio of the height H3 of the primary-secondary magnetic-facing portion with respect to the entire motor height H2 in the axial direction is extremely small. This is because, as described before, the winding height H1 occupies much of the axial space. As a result, the above mentioned magnetic-facing surface S is extremely small.

If, without changing the condition of the coil components, the magnetic-facing surface can fill the axial motor space fully, the above mentioned proportional constant can be greatly improved. This can easily reduce the loss in the same torque (or output) to ½ or ⅓, for example.

This condition is possibly created depending on the structure. In other words, it is structurally possible to increase the height of the primary-secondary magnetic facing surface to a great extent without degrading the coil components. By employing such a structure, it is possible to greatly increase the efficiency value and decrease the loss.

According to the present invention, the toroidal winding and the partial laminating core are cooperatively used to optimally use the space in the height direction, which has been the drawback of the conventional structure. Because the coil components are not degraded, the above mentioned proportional constant can be greatly improved. Consequently, the loss will be decreased, thus improving the efficiency value.

More specifically, the following effects can be obtained.

By adopting the toroidal winding structure, the facing surface slit width of a slot portion, which conventionally requires a wide space for winding, can be now narrow, and thus, the facing surface can be enlarged while the higher order torque is reduced. In addition, the space factor, which was conventionally difficult to improve even when the winding method is improved, can be easily improved. Furthermore, because there is no superposing portion in the winding, it is easily adopted in a design of enlarged winding cross-sectional surface. Thus, the coil length per winding turn is also shorten.

The partial laminating core structure enables one to fully use the space in the motor height direction as the magnetic facing surface. Moreover, even such a structure barely affects the winding and degrades the coil components. On the contrary, the drawback of the conventional toroidal winding structure, that the coil length per winding turn becomes long with the increased core lamination thickness and the winding space becomes narrow depending on the width of the core rib portion, can be resolved with the use of the partial laminating core structure.

Also, other methods of effectively using the space in the motor height direction as a magnetic facing surface are so-called magnetic flux collecting yoke structure and magnetic powder yoke structure. However, the partial laminating core structure is superior in space utilization percentage, magnetic property, processability, etc. For example, with the collected-magnet yoke structure, the space cannot be fully used, partially because of magnetic saturation, the difficulty of shaping, and the high die cost. The magnetic powder yoke structure also has drawbacks such as poor magnetic properties and high die cost.

With the partial laminating core structure, the core lamination height at the core rib portion is increased; therefore, the same cross-sectional area of magnetic path can be obtained even when the rib width is decreased. As a result, the winding space can be increased. By elongating the partial laminating core in the radial direction for projection, the magnetic flux lines in the lamination (axial) direction become smooth, the fixing strength of the partial laminating core is increased, and the fixing and positioning thereof to the outer frame is facilitated.

BRIEF DESCRIPTION OF THE DRAWINGS

In the drawings:

FIGS. 6(*a*) and 6(*b*) are a plan view of a shape of a core piece that constitutes the laminated core illustrated in FIGS. 4 and 5;

DESCRIPTION OF THE PREFERRED EMBODIMENTS

Embodiments of the present invention will be described in detail based on the drawings.

In an embodiment illustrated in FIG. 1 through FIG. 5, the present invention is applied to a stator and a rotor in an inductance motor. A stator 2 attached to an inner circumferential wall of a stator frame 1 is placed to surround an outer circumference of a rotor 4 fixed to a rotary shaft 3. To an annular core portion 5 of a laminated core constituting the stator 2, a plurality of rib-like core portions 6 are provided such that they extend radially and are spaced at a predetermined interval in the circumferential direction. Also, a coil 8 is wound with a toroidal winding around the annular core portion 5 within each slot 7 created between a pair of rib-like core portions 6 which are adjacent in the circumferential direction. At the inner edge portion of each rib-like core portion 6, a facing core portion 9 that faces the rotor 4 is provided.

Figure 1:
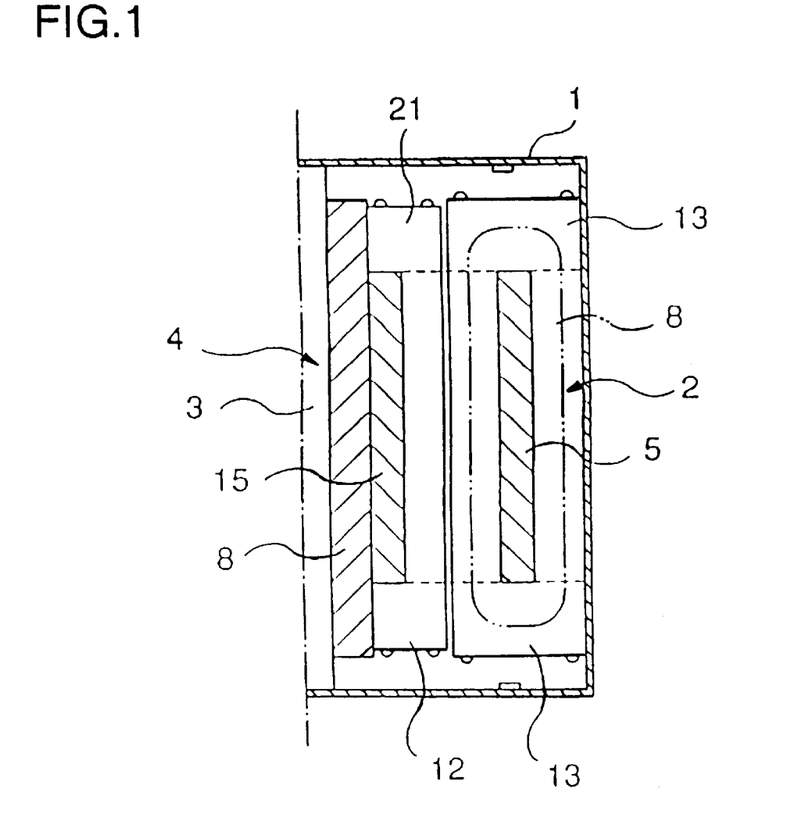
FIG. 1 is a schematic half vertical cross-sectional view showing the structure of a toroidal winding type inductance motor of an embodiment of the present invention.
Figure 2:
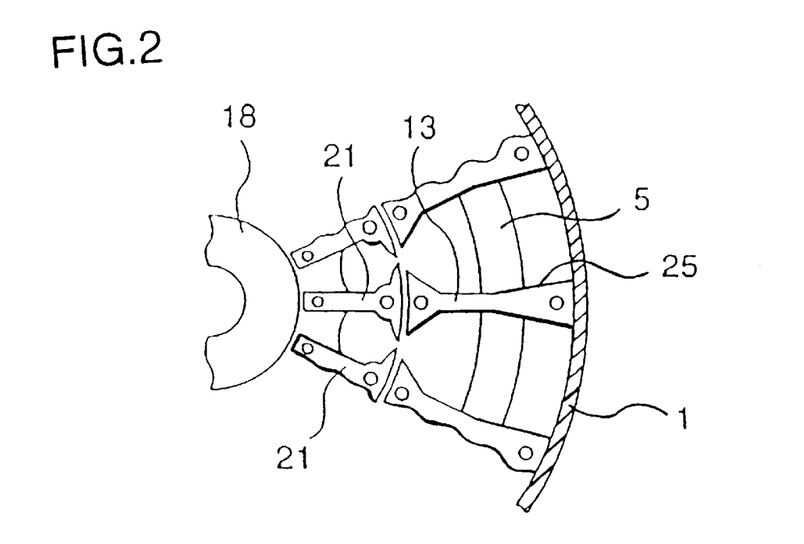
FIG. 2 is a schematic horizontal cross-sectional view of the toroidal winding type inductance motor illustrated in FIG. 1.
Figure 3:
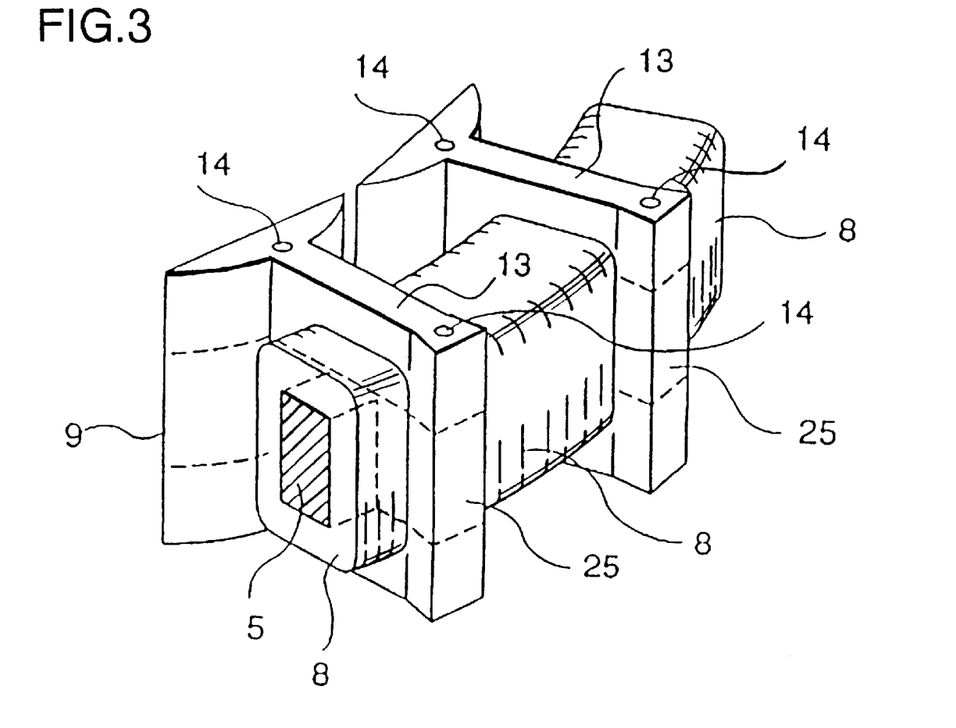
FIG. 3 is a perspective outlook of a structure of a stator in FIGS. 1 and 2.
Figure 4:
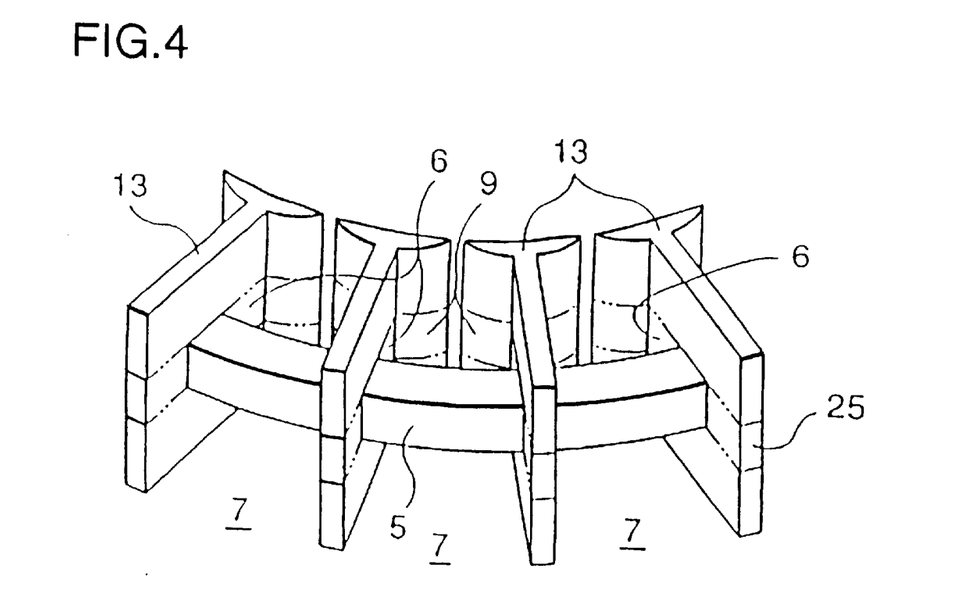
FIG. 4 is a perspective outlook of a structure of a laminated core of the stator illustrated in FIG. 3.
Figure 5:
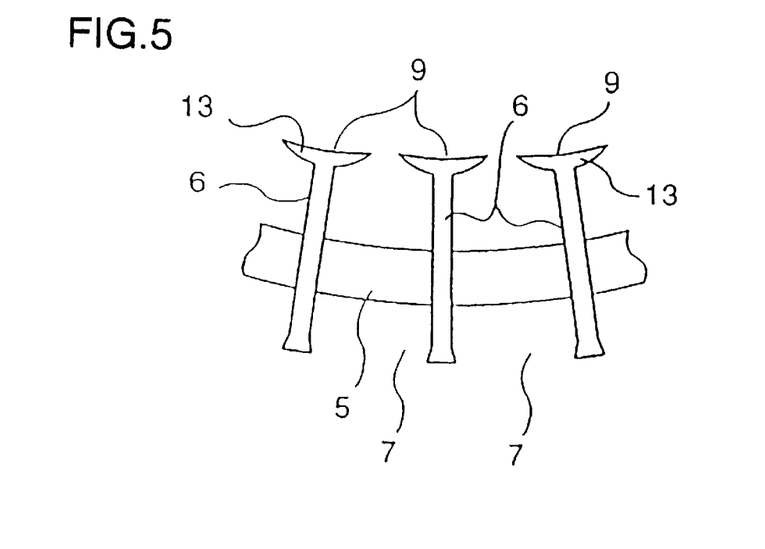
FIG. 5 is a plan view of the structure of the laminated core of the stator illustrated in FIG. 3.
Figures 6A, 6B:
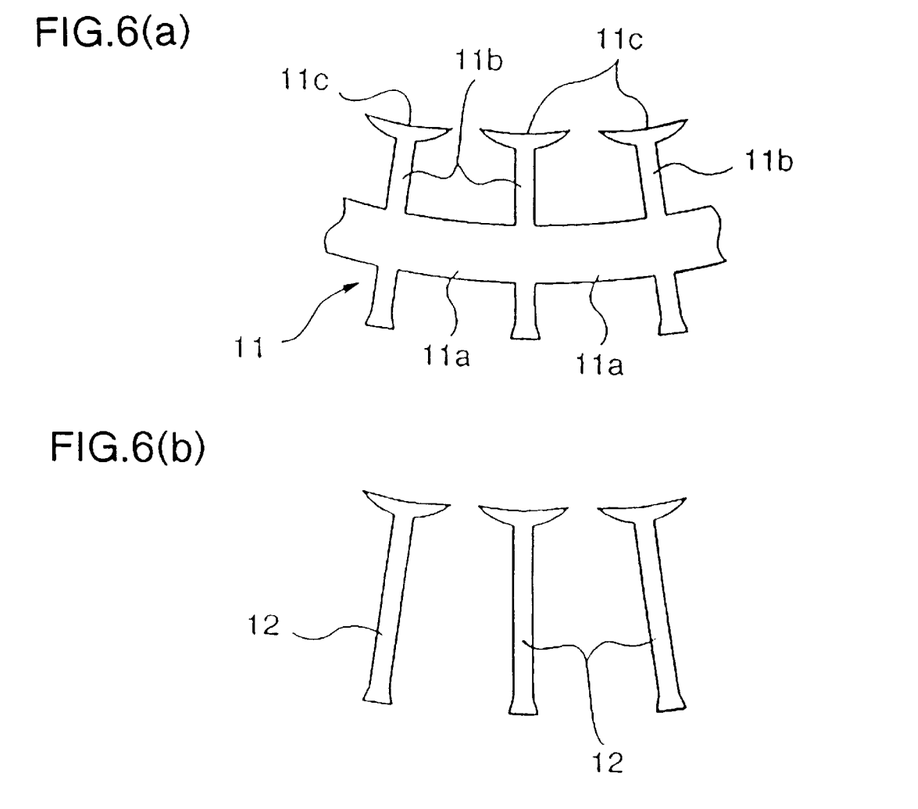

The laminated core is made by laminating core pieces of silicon steel sheets that are punched out in a predetermined shape, wherein partial core pieces 12 as illustrated in FIG. 6(b) are further laminated over a lamination base of an integral core piece 11 as illustrated in FIG. 6(a). In other words, the lamination base of integral core piece 11 constitutes an axially central portion of the laminated core, and comprises an annular core 5 forming portion 11a, a rib-like core 6 forming portion 11b that extends in the radial direction from the annular core portion 5, and a facing core (magnet pole) 9 forming portion 11c that is formed at the inner edge portion of the rib-like core portion 6. A predetermined number of the integral core pieces 11 in the shape as illustrated in FIG. 6(a) are laminated in the axial direction to form the annular core portion 5, the rib-like core portion 6, and the facing core portion (magnet pole portion) 9 in a predetermined height. A coil 8 is wound with a toroidal winding around the annular core portion 5 made by laminating the integral core piece 11.

The partial core piece 12 illustrated in FIG. 6(b) consists of the rib-like core portion 6 and facing core portion (magnet pole portion) 9 but not the annular core portion 5. The partial core piece 12 is further laminated from both sides in the axial direction on the rib-like core portion 6 and facing core portion (magnet pole portion) 9 of the lamination base of integral core piece 11 to form the partial laminating core 13. The partial core piece 12 constituting the partial laminating core 13 is superposed to further heighten the rib-like core portion 6 and facing core portion 9 of the integral core piece 11. The partial laminating core 13 is fixed by a lamination caulking 14.

The partial laminating core 13 enlarges the axially facing surface which faces the rotor 4. The total lamination thickness in the axial direction (lamination direction) of the partial laminating core 13 and facing core portion 9 is larger than the thickness of the annular core portion 5. Also, the total lamination thickness of the facing core portion 9 and partial laminating core 13 is larger than the axial winding height of the coil 8.

On the other hand, as described later, the axial (lamination direction) thickness of the facing surface of the rotor 4 is larger than the thickness of the annular core portion 5, which is nearly the same as the aforementioned total lamination thickness. With this configuration, the partial laminating core 13 is confronted to the rotor 4.

Figure 7:
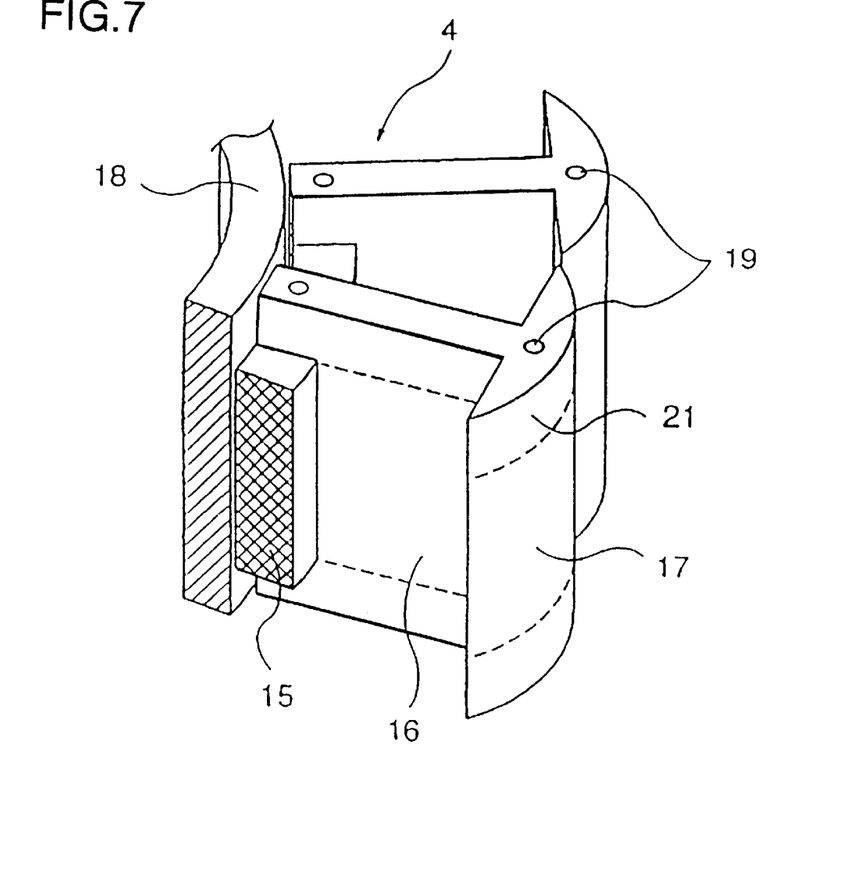
FIG. 7 is a schematic and perspective outlook of a structure of a rotor used in the toroidal winding type inductance motor illustrated in FIG. 1.

A laminated core constituting the rotor 4 uses the same structure as the laminated core of the stator 2. In particular, as illustrated in FIG. 7, a plurality of rib-like core portions 16 are integrally provided to an annular core portion 15 of the rotor 4 such that they extend radially and are spaced at a predetermined interval in the circumferential direction; a conductive portion (not illustrated) formed of an aluminum die casting is filled in each slot created between a pair of rib-like core portions 16 that are adjacent in the circumferential direction. At the radially outer edge portion of each rib-like core portion 16, a facing core portion 17 is provided to face the stator 2.

At the inner circumferential portion of the aluminum die casting in the conductive portion, that is, at the edge portion on the opposite side of the facing core portion 17, a cylindrical ring-shaped copper plate 18 is provided to form a conductive portion, and whereby excellent conductivity is provided. To increase conductivity of the conductive portion, a bar-like copper material may be inserted in each slot or the entire conductive portion may be made of copper material.

The above mentioned laminated core is made by axially laminating the core pieces of silicon steel plate which are punched out in a predetermined shape. On the lamination base of the integral core piece 11 in the shape as illustrated in FIG. 6(a), the partial core piece 12 in the shape as illustrated in FIG. 6(b) is further laminated. In other words, the lamination base of integral core piece 11 constitutes the axially central portion of the above mentioned laminated core, and consists of the annular core 15 forming portion, the rib-like core 16 forming portion that radially extends from the annular core portion 15, and the facing core portion (magnet pole portion) provided at the inner edge portion of the rib-like core portion 16. By axially laminating a predetermined number of the integral core pieces 11 in such a shape, the annular core portion 15, rib-like core portion 16, and facing core portion (magnet pole portion) 17 are formed in a predetermined height.

On the other hand, the partial core piece 12 consists of the rib-like core portion 16 and facing core portion (magnet pole portion) 17 but not the annular core portion 15. The partial core piece 12 is further laminated from both sides in the axial direction on the rib-like core portion 16 and facing core portion (magnet pole portion) 17 of the lamination base of integral core piece 11, and fixed by the lamination caulking 19. The partial core piece 12 is superposed to further heighten the rib-like core portion 16 and facing core portion 17 of the integral core piece 11. With this structure, the partial laminating core 21 consisting of a lamination base of the partial core piece 12 is formed.

The partial laminating core 21 enlarges the surface facing the stator 2 in the axial direction. The total lamination thickness of the partial laminating core 21 and facing core portion 17 in the axial direction (lamination direction) is larger than the thickness of the annular core portion 15. Also, the total lamination thickness of the facing core portion 17 and partial laminating core 21 is nearly the same as the axial height of the conductive portion.

The partial core piece 12, which constitutes the partial laminating core 13 and 21 respectively at the stator 2 and the rotor 4, may be made of silicon steel plate with no insulation coating, if needed, to improve the flow of the magnetic flux in the lamination direction (axial direction).

Figure 8:
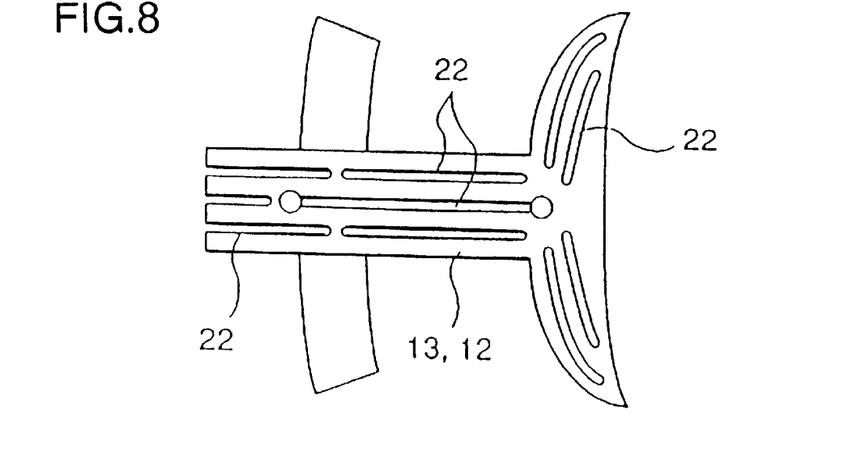
FIG. 8 is a plan view of a shape of an insulation slit cut in the core piece.
Figure 9:
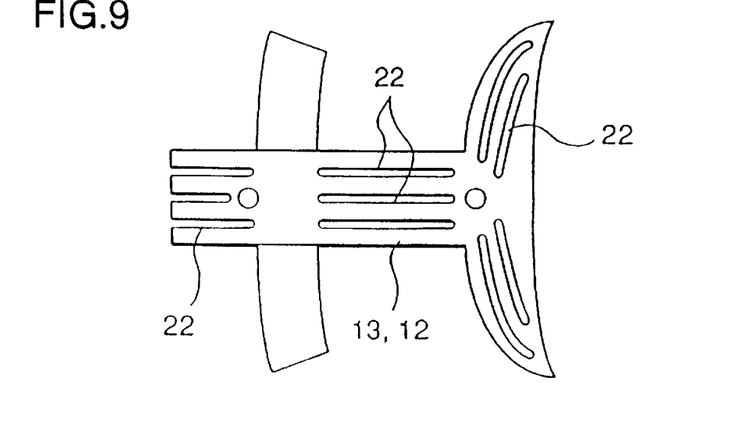
FIG. 9 is a plan view of another shape of the insulation slit cut in the core piece.

In the partial core piece 12 that constitutes the partial laminating core 13 and 21, an insulation slit 22 extending in multiple lines, as illustrated in FIG. 8, is formed if needed. The insulation slit 22 functions to prevent the generation of eddy currents which are generated by the magnetic flux passing the partial laminating cores 13 or 21 in the lamination direction (axial direction). Note that, to form the integral laminated cores including the partial laminating core 13 and 21 of the identical core pieces, as illustrated in FIG. 9, the insulation slit 22 is not formed at the portion corresponding to the annular core portion so that the flow of the magnetic flux in the annular direction is not prevented.

Returning to FIGS. 1 through 5, formed at the laminated core of the stator 2 is a projecting core portion 25 that projects outward in the radius direction from the annular core portion 5. The projecting core portion 25 is abutted to the stator frame 1 to fix the entire stator.

Figure 10:
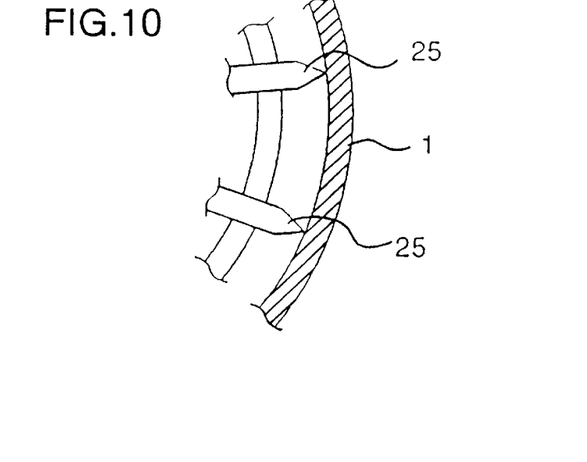
FIG. 10 is a plan view of an example of the structure of the stator.

With the stator frame 1 made of a magnetic material such as iron material, the projecting core portion 25 may be formed, as illustrated in FIG. 10, to reduce the cross-sectional surface thereof abutting the stator frame 1 so that the leak of the magnetic flux is reduced.

Furthermore, the facing surfaces of the facing core portions 9 and 17 of the stator 2 and rotor 4, which face one another, are formed such that the total width thereof obtained by summing the circumferentical width of each facing surface is at the ratio of 0.8 or more to the entire circumferential length. With this structure, the facing surface is mutually enlarged.

The embodiments of the invention by the present inventor has been described specifically. However, the present invention is not limited to the above mentioned embodiments, but it should be understood that it is modifiable within the scope of the invention.

Figure 11:
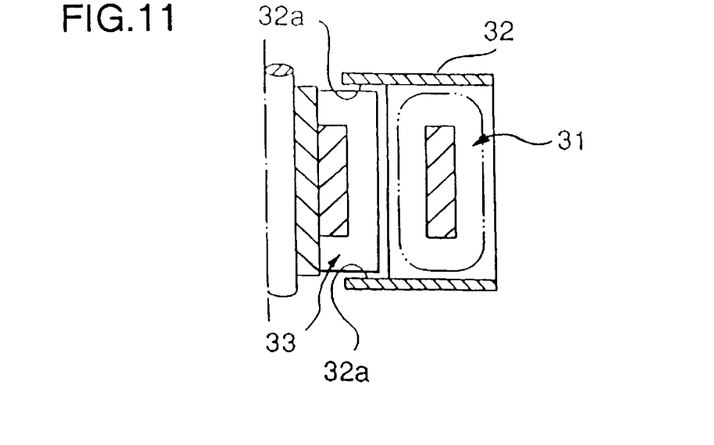
FIG. 11 is a schematic vertical cross-sectional view of another embodiment of the laminated core of the present invention.
Figure 12:
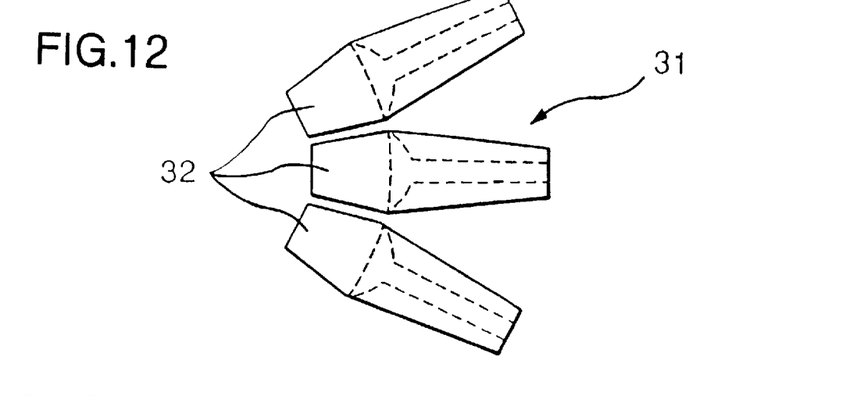
FIG. 12 is a plan view of the laminated core illustrated in FIG. 11.

For example, in another embodiment illustrated in FIGS. 11 and 12, provided at the partial laminating core 32 laminated on the facing core portion of a stator 31 is the axially facing surface 32a as well as the radially facing surface with respect to the rotor 33. The facing area is increased with these facing surfaces. The axially facing surface 32a at the partial laminating core 32 is enlarged by being extended in either the circumferential direction or the radius direction, and also provided in pair by sandwiching the rotor 33 in the axial direction.

Figure 13:
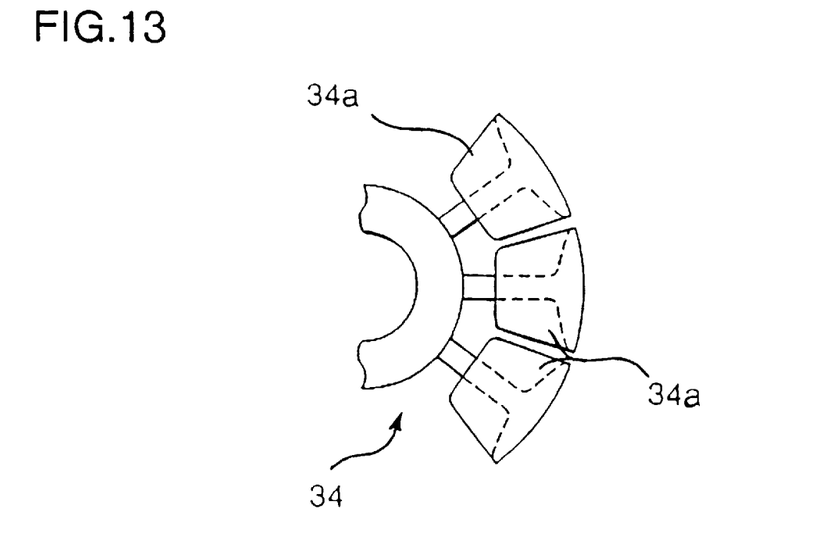
FIG. 13 is a schematic vertical cross-sectional view of another embodiment of the laminated core of the present invention.

In another embodiment illustrated in FIG. 13, the axially facing surface 34a is provided on the rotor 34 side.

Figure 14:
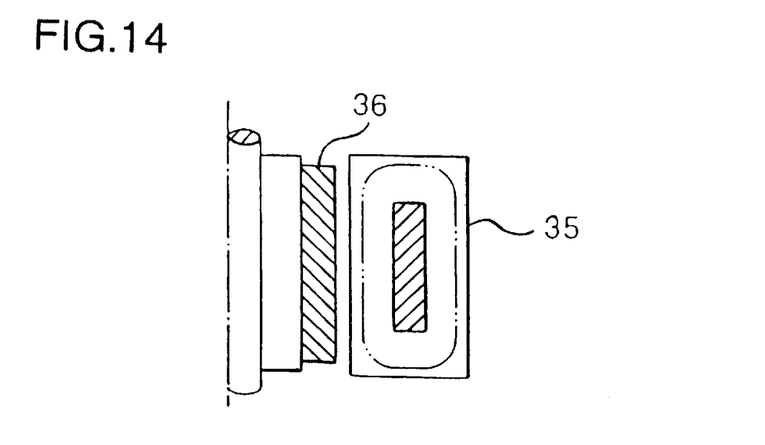
FIG. 14 is a schematic vertical cross-sectional view of an embodiment in which the present invention is applied to a magnet synchronous machine.

FIG. 14 shows an example in which the present invention is applied to an armature of an AC synchronous machine. An armature 35 is provided to face a field magnet 36.

Figure 15:
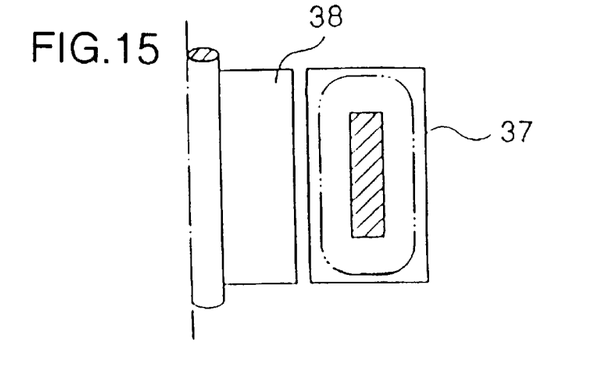
FIG. 15 is a schematic vertical cross-sectional view of an embodiment in which the present invention is applied to a reluctance type rotating electric machine.

In another embodiment illustrated in FIG. 15, the present invention is applied to an armature of an AC reluctance synchronous machine. An armature 37 is provided to face an iron core 38 in the radial direction.

In each of the above mentioned embodiments, the present invention is applied in an inner rotor type, but also can be applied in an outer rotor type.

Figure 16:
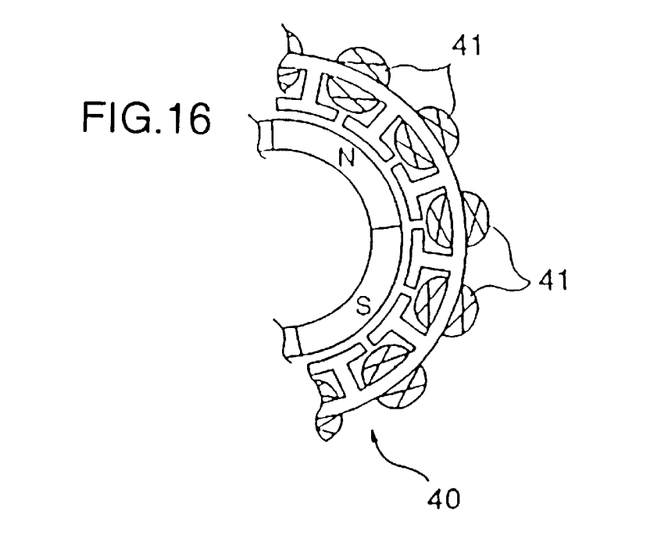
FIG. 16 is a schematic plan view of an embodiment in which the coil of the present invention is wound by a concentrated winding.

In an rotating electric machine of an embodiment illustrated in FIG. 16, a coil 41 of three-phase in U, V, W is stored such that one phase per slot is arranged in sequence of the phase in an armature 40. At the coil in each-phase, a square magnetic field having the same cycle as the magnetic pole pitch is generated. The present invention can be applied to such a structure in the same manner.

Figure 17:
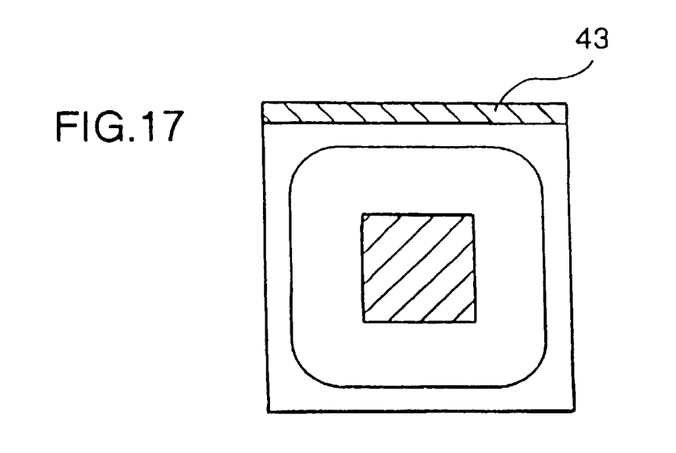
FIG. 17 is a schematic vertical cross-sectional view of an embodiment in which the present invention is applied to a surface-facing type rotating electric machine.
Figure 18:
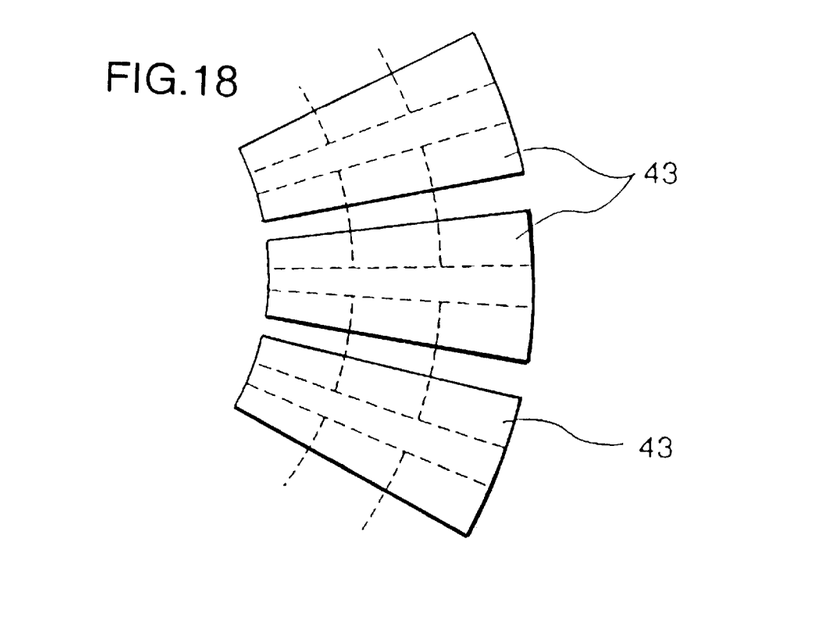
FIG. 18 is a plan view of the surface-facing type rotating electric machine illustrated in FIG. 17.

In an embodiment illustrated in FIGS. 17 and 18, the present invention is applied to a so-called surface-facing type rotating electric machine, wherein a topmost core portion 43 of the partial laminating core is axially confronted with the member on the other side.

As mentioned earlier, the present invention can be applied not only to the motors in the above mentioned embodiments, but also to generators.

As described above, according to the present invention, the toroidal winding and the partial laminating core are cooperatively used to fully utilize the space in the height direction, which is a drawback of the conventional structure. Also, as the coil components will not be degraded, the proportional constant that determines the relationship between the torque and the copper loss is greatly improved. Thus, the loss is remarkably reduced, resulting in greatly improving the efficiency value and property of the rotating electric machine.

While the foregoing description and drawings represent the preferred embodiments of the present invention, it will be obvious to those skilled in the art that various changes and modifications may be made therein without departing from the true spirit and scope of the present invention.

What is claimed is:

1. A structure of an armature of a rotating electric machine, which constitutes at least a member of a stator or a rotor, comprising:

a laminated core having an annular core portion and a facing core portion that extends from said annular core portion toward an opposing machine member, said annular core portion and said facing core portion being integrally formed;

a coil being wound with a toroidal winding about said annular core portion of said laminated core;

a partial laminating core being laminated on said facing core portion of said armature to enlarge a facing surface opposite said opposing machine member, said partial laminating core being laminated in a shape that continuously extends from said facing core portion to at least said annular core portion; and wherein a total lamination thickness of said facing core portion and said partial laminating core is larger than a thickness of said annular core portion, and a thickness of said facing core portion and said partial laminating core being the same.

2. The structure of an armature of a rotating electric machine as set forth in claim 1 wherein said laminated core and said partial laminating core are made of silicon steel plate.

3. The structure of an armature of a rotating electric machine as set forth in claim 2 wherein said silicon steel plate of said laminated core and said partial laminating core is laminated on both surfaces in a sheet thickness direction without interposing an insulation coating.

4. The structure of an armature of a rotating electric machine as set forth in claim 2 wherein an insulation slit that extends along a flow of magnetic flux is cut in said partial laminating core.

5. The structure of an armature of a rotating electric machine as set forth in claim 1 wherein a projecting portion that projects from said annular core portion in a radius direction opposite said facing core portion is formed at said partial laminating core and said laminated core.

6. The structure of an armature of a rotating electric machine as set forth in claim 5 wherein said projecting portion is abutted to a support frame to determine a position of said armature.

7. The structure of an armature of a rotating electric machine as set forth in claim 6 wherein a surface of said projecting portion that abuts said support frame is smaller than a cross-sectional surface of other section of said projecting portion.

8. The structure of an armature of a rotating electric machine as set forth in claim 1 wherein said laminated core and partial laminating core are fixed by a lamination caulking.

9. The structure of an armature of a rotating electric machine as set forth in claim 1 wherein a total lamination thickness of said facing core portion and said partial laminating core portion is at least equal to a coil winding height.

10. The structure of an armature of a rotating electric machine as set forth in claim 1 wherein said facing surface of said facing core portion which faces said opposing machine member on another side is formed such that a total width obtained by summing a circumferential width of said facing surface of said facing core portion is at the ratio of at least 0.8 with respect to an entire circumferential length.

11. The structure of an armature of a rotating electric machine as set forth in claim 1 wherein said facing core portion of said partial laminating core includes a radially facing surface and an axially facing surface facing said opposing machine member radially and axially, respectively.

12. The structure of an armature of a rotating electric machine as set forth in claim 11 wherein said axially facing surface of said partial laminating core at endmost is enlarged in a circumferential or radius direction to increase a facing surface.

13. The structure of an armature of a rotating electric machine as set forth in claim 11 wherein said axially facing surface at endmost is projected to face said opposing machine member in an axial direction.

14. The structure of an armature of a rotating electric machine as set forth in claim 11 wherein said axially facing surface that axially faces said opposing machine member on another side is provided axially at both ends of said armature.

15. The structure of an armature of a rotating electric machine as set forth in claim 1 wherein said armature is a stator of an inductance motor.

16. The structure of an armature of a rotating electric machine as set forth in claim 1 wherein said armature is a rotor of an inductance motor.

17. The structure of an armature of a rotating electric machine as set forth in claim 16 wherein a cylindrical ring-shaped copper material, provided at a portion radiusly opposite said facing core portion of said annular core portion, functions as a part of conductive portion.

18. The structure of an armature of a rotating electric machine as set forth in claim 17 wherein another conductive portion formed of an aluminum die casting is filled around said conductive portion and said annular core portion.

19. The structure of an armature of a rotating electric machine as set forth in claim 17 wherein a bar-like copper material is inserted into a slot portion of said armature to function as a part of said conductive portion.

20. The structure of an armature of a rotating electric machine as set forth in claim 17 wherein the entire conductive portion of said armature is made of copper material.

21. The structure of an armature of a rotating electric machine as set forth in claim 1 wherein said armature is a stator in one of an ac magnet synchronous machine and an ac reluctance synchronous machine.

22. The structure of an armature of a rotating electric machine as set forth in claim 1 wherein said rotating electric machine employs an inner rotor structure.

23. The structure of an armature of a rotating electric machine as set forth in claim 1 wherein said rotating electric machine employs an outer rotor structure.

24. The structure of an armature of a rotating electric machine as set forth in claim 1 wherein said coil is wound such that a coil in one phase is stored in one slot within one magnet pole.

25. The structure of an armature of a rotating electric machine as set forth in claim 24 wherein a rotor on another side, constituting another member, is configured in one of a field magnet shape and a reluctance shape.

26. The structure of an armature of a rotating electric machine wherein a partial laminating core is laminated in layer over core portions other than winding portions of a lamination core in which a coil is wound around an annular core portion with a toroidal winding, a topmost surface of said partial laminating core is made to be a magnetic-facing surface which axially faces a secondary member constituting an opposing machine said partial laminating core being laminated in a shape that continuously extends from the topmost surface of said partial laminating core to at least said annular core portion, said annular core portion and said partial laminating core being integrally formed, and a thickness of a facing core portion and said partial laminating core being the same.

* * * * *